United States Patent Office 3,545,848
Patented Dec. 8, 1970

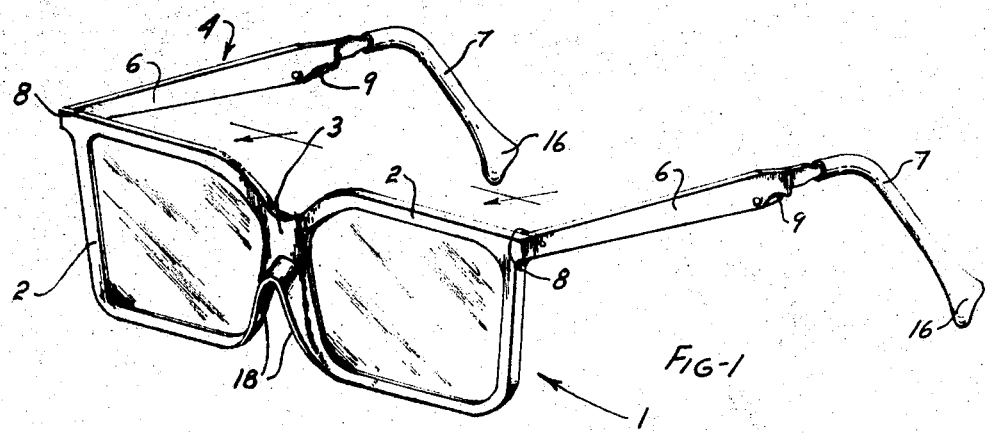
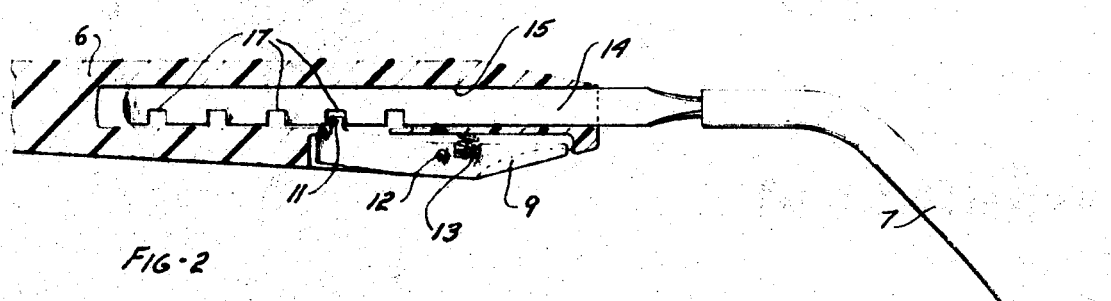
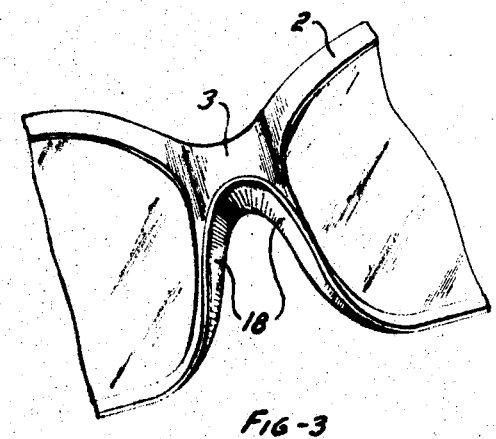
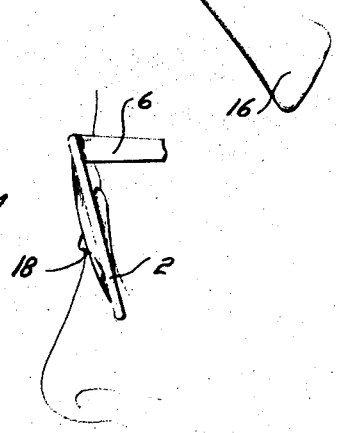
Peter T. Sebastian
INVENTOR.
BY Synnestvedt & Lechner
ATTORNEY

3,545,848
MANUALLY ADJUSTABLE TEMPLES FOR EYEGLASSES
Peter T. Sebastian, Chestnut St., Leesport, Pa. 19533
Filed July 16, 1968, Ser. No. 745,233
Int. Cl. G02c 5/20; F16b 7/14
U.S. Cl. 351—118   10 Claims

ABSTRACT OF THE DISCLOSURE

Eyeglass frames are provided that are adapted to fit comfortably on and be properly worn by individuals having different facial features and measurements. The frames feature an adjustable temple and may include a universal self-aligning bridge.

The adjustable temple is comprised of a notched paddle section adapted to slide in telescoping relationship with the butt section. A spring-loaded pawl mounted in the butt section engages the notches in the paddle section to secure the alignment between the paddle and the butt sections.

The nose bearing surface of the self-aligning bridge is a compound curve generated from a series of intersections of the human nose with parallel planes tilted slightly forward with respect to the vertical.

BACKGROUND OF THE INVENTION

Field of the invention

This invention generally relates to eyeglass frames adapted to be worn by persons having different facial characteristics and measurements. More particularly, this invention relates to an adjustable temple and a universal bridge that enable the frames to be worn by persons having different facial features.

Description of the prior art

There are many occasions when it is desirable to provide eyeglass frames that may be adapted to be worn by different people having different facial features and measurements. Even if only worn by a single individual, eyeglass frames sometimes require periodic adjustment, particularly if a hearing aid is associated with the paddle section.

Eyeglass frames adapted to be worn by different people find use, for example, as trial ophthalmic frames, for nonprescription sunglasses, and for safety glasses to be worn by workers and plant visitors.

It is important that glasses fit comfortably so that they do not cause undue annoyance or fatigue to the wearer. Also, in the case of safety glasses, it is important that they fit correctly to provide sharp vision and to protect the eyes from flying debris and airborne contamination. To accomplish these objectives, it is important that the glasses fit comfortably on the wearer and that they be positioned properly for ophthamological and safety purposes.

In order to avoid stocking a large supply of eyeglass frames of varying sizes, it has been proposed to provide eyeglasses with adjustable or interchangeable temples so that a properly dimensioned temple may be selected to fit the individual wearer. The means by which this has been accomplished by the prior art are varied and all suffer from certain inherent inconveniences.

For example, a series of temples, all of different size, can be held in stock and fitted onto the frames to suit the individual wearer. Not only does this require the stocking of a number of different sized temples, but also necessitates the manipulative step of securing different temples, as by a small screw fastener, onto the frames each time an adjustment is desired.

Adjustable telescopic temples have been used in the prior art. Some of these require the use of special tools, such as small screwdrivers and the like, to make the adjustment. Obviously, it is preferable to provide an adjustable temple that does not require the use of special tools so that the individual wearer may adapt the temples to suit his purposes immediately and without difficulty.

Other adjustable temples known to the prior art can be adjusted without tools, but are awkward and require a certain minimum dexterity to adjust.

Still other adjustable temples that have been used are variously bulky, heavy to wear, and may detract from one's appearance.

SUMMARY OF THE INVENTION

Accordingly, it is an object of this invention to provide eyeglass frames that are readily adaptable to be correctly worn by persons having different facial characteristics and measurements.

Another object of this invention is to provide eyeglass frames that are readily adaptable to be worn by different individuals which are cosmetically acceptable and ophthalmically correct.

Another object of this invention is to provide eyeglass frames that may readily be adjusted without special skills or tools being required.

Another object of this invention is to provide a bridge for eyeglass frames that, without adjustment, will align itself with the configuration of the nose so that it may be worn comfortably and correctly by the wearer.

These and other objects of this invention are achieved by providing glass frames having a temple section that enables the paddle section to slide in telescopic relationship with the butt section. Means are provided to secure the paddle section relative to the butt section including a notched bayonet on the forward portion of the butt section hat is engaged by a spring-biased, lever-controlled pawl on the butt section. Additionally, if desired, a universal bridge adapted to seat in self-aligning relationship with the nose of the wearer is provided by shaping the bridge to conform to a compound curve that is generated by a series of planes intersecting a nose at a slight forward angle to the vertical.

DEFINITIONS

Since different terms are sometimes used to define various structural features that are here discussed, it is thought useful to provide the following definitions:

The term "frames" is used to refer to the entire structure of the eyeglass-supporting apparatus.

The term "bridge" is used to refer to the connecting element between the two rims of the frames that is adapted to rest on the nose of the wearer.

The term "temple" is used to refer to the earpiece that is usually pivotally engaged with the rims.

The term "butt section" is used to refer to the forward or rim-engaging portion of the temple.

The term "paddle section" is used to refer to the rearward or ear-engaging portion of the temple.

The term "cable temple" is used to refer to a temple having a paddle section that contains a wound wire reinforcement.

DESCRIPTION OF THE DRAWINGS

FIG. 1 is a perspective view of glass frames made in accordance with this invention.

FIG. 2 is a view, partially in section, and partially broken away, of a temple made in accordance with the teachings of this invention.

FIG. 3 is a perspective view of the frames of FIG. 1 taken along the plane 3—3 as shown in FIG. 1.

FIG. 4 is a partial side view of the invention on a wearer's face.

With reference to FIG. 1, there are generally shown eyeglass frames 1 being comprised of a pair of rims 2 interconnected by a bridge 3 that is adapted to seat on the nose of the wearer. The eyeglass frames 1 include temple sections 4 having a forward butt section 6 and a rearward paddle section 7. The temple sections 4 are pivotally engaged with the rims 2 by means of hingles 8.

As can be seen most clearly in FIG. 2, the butt section 6 of the temple 4 include a locking mechanism that is comprised of a pivot arm 9, a pawl 11, a pivot pin 12, and a spring 13. Since the pivot arm 9 is adapted for rotation about the pivot pin 12, the pawl 11 may be moved to a disengaging position by depressing the outer depending surface of the pivot arm 9.

The spring 13 biases the pivot arm 9 in a manner such that the pawl 11 normally is urged into engaging relationship to the paddle section 7.

The paddle section 7 of the temple 4 is comprised of a notched, sliding core or bayonet section that is adapted to be slid in telescoping relationship to the receiving sheath of the butt section 6. The paddle section terminates at its other end with an ear-engaging piece 16. The notched, sliding core or bayonet portion carries a series of notches 17 that are adapted to be engaged by the pawl 11.

In operation, it can be appreciated that the temple 4 can readily be adapted to the facial characteristics and dimensions of a wearer's head. By depressing the pivot arm 9, the pawl 11 will be released from the notches 17 so that the paddle section 7 may be slid in telescoping relationship either into or out of the receiving sheath 15. Since temples are generally manufactured in quarter inch increments, it may be convenient to provide notches 17 on quarter inch centers.

From the above it can be appreciated that the adjustable temples of this invention are quite advantageous in that they may readily be adjusted without the use of special tools and in that they are trim, neat, lightweight, and cosmetically acceptable.

With reference to FIG. 3, a perspective view of the universal bridge of this invention is shown. As can be seen in FIG. 4, the curvature of the bearing surface of the bridge 18 is adapted to seat over the entire bridge of the nose rather than just at several points as is common with most bridges. By this means, the bearing pressure per unit area is considerably reduced and the glasses are considerably more comfortable to wear.

The curvature of the bearing surface 18 is generated by the intersection of a series of parallel planes with the nose of an average individual. Preferably, these planes are inclined slightly forward at an angle of about 14°, which generally is considered to be the panoscopic angle. The reason for this angle is twofold. First, it brings the bottom of the rims into close proximity with the cheek of the wearer in order to protect from small particles that may fly up from the underside of the glasses. Secondly, this angle is useful to the wearer since it provides a proper alignment for the eyes to look downward as onto a workpiece.

The intersection of the series of planes will describe the bearing surface 18. This results in a compound conical section that will fit most common noses over the entire portion of the bearing surface. As previously mentioned, due to this larger contact area, much of the irritation that may accompany wearing glasses is relieved.

As illustrated in the drawings, the resilient member 13 is in the form of a small wound metal spring. It is to be understood that any resilient means could be substituted therefor including, for example, a leaf spring comprised of metal or plastic.

Although certain embodiments of this invention have been shown in the drawings and described in the specification, it is to be understood that this invention is not limited thereto, is capable of modification, and can be rearranged without departing from the spirit and scope of the invention.

I claim:

1. An eyeglass frame comprising:
   a rim;
   an adjustable temple comprised of a butt section, the butt section having a receiving sheath disposed at one end thereof, and a paddle section, a fore portion of the paddle section being adapted to be slidably received in the sheath of the butt section;
   means mounting the end of the butt section opposite the sheath to the rim;
   means for adjustably securing the paddle section relative to the butt section in a plurality of discrete positions, the adjustable securing means including:
   a plurality of spaced notches disposed on the portion of the paddle section adapted to be slidably received in the butt section,
   a pivot arm mounted in the butt section adjacent the sheath,
   means intermediate the ends of the pivot arm for pivotally mounting the pivot arm to the butt section;
   a pawl disposed at one end of the pivot arm and adapted to engage the notches on the paddle section,
   resilient means coactive between the pivot arm and the butt section for biasing the pawl into engagement with the notches of the paddle section; and
   means disposed on the end of the pivot arm opposite the pawl, for enabling manual pivoting of the pivot arm against the bias of the resilient means.

2. An eyeglass frame according to claim 1 wherein a major portion of the pivot arm is disposed within the side, top, and bottom edge surfaces of the butt section, and the enabling means is a surface which normally extends beyond an edge surface of the butt section and by which the pivot arm is depressed, thereby moving the pawl to a disengaging position.

3. An eyeglass frame according to claim 2 wherein the notches in the paddle section are formed on a bottom edge thereof, and the pivot arm is mounted in the butt section below the sheath with the pawl extending generally upwardly toward the sheath and with the outer surface depending from a bottom edge of the butt section.

4. An eyeglass frame according to claim 1 wherein the pivotal mounting means comprises a pivot pin extending generally transversely to a longitudinal axis of the pivot arm.

5. Glasses according to claim 1 including a self-aligning bridge having a bearing surface comprised of a compound curve shaped to conform with the nose of the wearer.

6. Glasses according to claim 5 wherein the compound curve is developed from the intersection of a series of parallel planes with the nose taken at an angle slightly inclined to the vertical.

7. Glasses according to claim 6 wherein the angle from the vertical plane is from about 10° to about 18°.

8. An adjustable temple for use with eyeglasses comprising:
   a butt section having a sheath at one end thereof;
   a paddle section including a fore portion dimensioned to be slidably received in the sheath of the butt section;
   means for adjustably securing the paddle section to the butt section in a plurality of discrete positions;
   the adjustable securing means including notches on the portion of the paddle section to be received in the sheath, a pivot arm, means disposed intermediate the ends of the pivot arm for pivotally mounting the pivot arm on the butt section, a pawl disposed at one end of the pivot arm and adapted to engage the notches on the paddle section, resilient means coactive between the pivot arm and the butt section for biasing the pawl into engagement with the notches of the paddle section, and means disposed on the end of the pivot arm opposite the pawl for enabling manual pivoting of the pivot arm against the bias of the resilient means.

9. An adjustable temple according to claim 8 wherein a major portion of the pivot arm is disposed within side, top, and bottom edge a surface of the butt section, and the enabling means is an outer surface which normally extends beyond a peripheral edge surface of the butt section and by which the pivot arm is depressed, thereby moving the pawl to a disengaging position.

10. An adjustable temple according to claim 8 wherein the notches in the paddle section are formed on a bottom edge thereof, and the pivot arm is mounted in the butt section below the sheath with the pawl extending generally upwardly toward the sheath and with the outer surface depending from a bottom edge of the butt section.

References Cited

UNITED STATES PATENTS

| | | | |
|---|---|---|---|
| 1,548,823 | 8/1925 | Clulee | 351—124 |
| 3,233,956 | 2/1966 | De Angelis | 351—130 |
| 3,318,654 | 5/1967 | Kreuzberger et al. | 351—118 |

DAVID SCHONBERG, Primary Examiner

R. L. SHERMAN, Assistant Examiner

U.S. Cl. X.R.

287—58; 351—116